(12) United States Patent
Sai et al.

(10) Patent No.: US 12,312,167 B2
(45) Date of Patent: May 27, 2025

(54) STOCKER SYSTEM

(71) Applicant: MURATA MACHINERY, LTD., Kyoto (JP)

(72) Inventors: Jun Sai, Ise (JP); Nobuhiko Baba, Ise (JP)

(73) Assignee: MURATA MACHINERY, LTD., Kyoto (JP)

( * ) Notice: Subject to any disclaimer, the term of this patent is extended or adjusted under 35 U.S.C. 154(b) by 864 days.

(21) Appl. No.: 17/605,597

(22) PCT Filed: Mar. 26, 2020

(86) PCT No.: PCT/JP2020/013802
§ 371 (c)(1),
(2) Date: Oct. 22, 2021

(87) PCT Pub. No.: WO2020/230463
PCT Pub. Date: Nov. 19, 2020

(65) Prior Publication Data
US 2022/0258970 A1    Aug. 18, 2022

(30) Foreign Application Priority Data
May 14, 2019    (JP) .................................. 2019-091618

(51) Int. Cl.
*B65G 1/04* (2006.01)
*B66F 9/07* (2006.01)

(52) U.S. Cl.
CPC ............ *B65G 1/0421* (2013.01); *B66F 9/072* (2013.01); *B65G 2201/02* (2013.01)

(58) Field of Classification Search
CPC ..... B65G 1/0421; B65G 1/0407; B66F 9/072; B66F 9/205
See application file for complete search history.

(56) References Cited

U.S. PATENT DOCUMENTS

| | | | |
|---|---|---|---|
| 11,053,073 B2* | 7/2021 | Clarke | .................... A62C 3/002 |
| 11,623,342 B2* | 4/2023 | Coady | .................... B25J 9/1676 |
| | | | 700/79 |

(Continued)

FOREIGN PATENT DOCUMENTS

| | | | |
|---|---|---|---|
| JP | 2006-335484 A | 12/2006 |
| JP | 2015-009952 A | 1/2015 |
| JP | 2016-124687 A | 7/2016 |

OTHER PUBLICATIONS

Official Communication issued in International Patent Application No. PCT/JP2020/013802, mailed on Jun. 23, 2020.

(Continued)

*Primary Examiner* — Patrick H Mackey
(74) *Attorney, Agent, or Firm* — Keating & Bennett, LLP (57) ABSTRACT

A stocker system includes an operation controller to control operation of stacker cranes in a plurality of stockers, a maintenance room provided between adjacent stockers to allow entry of both stacker cranes in the adjacent stockers and capable of accommodating at least one of the stacker cranes, and an identifier to identify which of the stacker cranes in the adjacent stockers is the stacker crane accommodated in the maintenance room. The operation controller restricts operation of the stacker crane identified by the identifier.

11 Claims, 8 Drawing Sheets

(56) References Cited

U.S. PATENT DOCUMENTS

| | | | |
|---|---|---|---|
| 2006/0276930 A1* | 12/2006 | Tsujimoto | B65G 1/0492 |
| | | | 700/214 |
| 2016/0332815 A1 | 11/2016 | Ueda et al. | |
| 2017/0176323 A1* | 6/2017 | Murayama | G01N 21/21 |
| 2017/0267454 A1* | 9/2017 | Adachi | B65G 1/065 |
| 2023/0294916 A1* | 9/2023 | Yagawa | B65G 1/0407 |
| | | | 414/273 |
| 2023/0373716 A1* | 11/2023 | Sai | B66F 9/24 |

OTHER PUBLICATIONS

Official Communication issued in International Patent Application No. PCT/JP2020/013802 mailed on Nov. 25, 2021.

English translation of Official Communication issued in International Patent Application No. PCT/JP2020/013802 mailed on Jun. 23, 2020.

* cited by examiner

STOCKER SYSTEM

BACKGROUND OF THE INVENTION

1. Field of the Invention

An aspect of the present invention relates to a stocker system including stockers for storing articles.

2. Description of the Related Art

Stockers including stacker cranes for transporting articles (automated warehouses) are known. In such a stocker, a stacker crane moves along a plurality of shelves arranged in a stocker body and transports an article between an inbound/outbound port and a shelf. The operation of the stacker crane is automatically controlled by a controller capable of communication by wire or by radio.

SUMMARY OF THE INVENTION

In development of a novel stocker system including a plurality of stockers arranged along a traveling direction of a stacker crane and a maintenance room for the stacker crane between adjacent stockers, the safety of operators in maintenance operation in the maintenance room needs to be ensured.

Preferred embodiments of the present invention provide stocker systems each capable of ensuring the safety of operators in maintenance operation.

A stocker system according to an aspect of a preferred embodiment of the present invention is a stocker system in which a plurality of stockers each including a shelf to accommodate an article, a stacker crane to transfer the article, and a body accommodating the shelf and the stacker crane are arranged in a traveling direction of the stacker crane, the stocker system including an operation controller configured or programmed to control operation of the stacker crane in each of the stockers, a maintenance room between the stockers adjacent to each other to allow entry of both of the stacker cranes in the adjacent stockers, and capable of accommodating at least one of the stacker cranes, and an identifier to identify which of the stacker cranes in the adjacent stockers is the stacker crane accommodated in the maintenance room. The operation controller is configured or programmed to restrict operation of the stacker crane identified by the identifier.

Since this configuration can identify which of the stacker cranes in the adjacent stockers is the stacker crane accommodated in the maintenance room, the operation of the stacker crane whose operation should be restricted in the maintenance room can be restricted reliably. This configuration can prevent the operator from being in danger due to the operation of the stacker crane accommodated in the maintenance room. As a result, the safety of the operator in maintenance operation can be ensured.

In a stocker system according to an aspect of a preferred embodiment of the present invention, the operation controller may prohibit the stacker crane identified by the identifier from operating. With this configuration, the safety of the operator in maintenance operation can be ensured more reliably.

A stocker system according to an aspect of a preferred embodiment of the present invention may further include a first cable including a proximal end portion in the stocker and a distal end portion connected to the stacker crane, a partitioning plate at each of a first boundary that is a boundary between one of the stockers and the maintenance room and a second boundary that is a boundary between the other stocker and the maintenance room, the partitioning plate including an opening portion to allow the first cable to pass through and a door to switch an open state in which the opening portion is open and a closed state in which the opening portion is closed, a first detector to detect whether there is an opening in the partitioning plate at the first boundary, and a second detector to detect whether there is an opening in the partitioning plate at the second boundary. The identifier may identify which of the stacker cranes in the adjacent stockers is the stacker crane identified by the identifier, based on detection results of the first detector and the second detector.

The stocker system with this configuration can identify which of the stacker cranes in the adjacent stockers is the stacker crane accommodated in the maintenance room, with a simpler configuration, by using the first cable connected to the stacker crane.

A stocker system according to an aspect of a preferred embodiment of the present invention may further include a determiner to determine whether the stacker crane is present inside each of the stockers. Since this configuration can detect the possibility that the stacker crane is present inside the stocker, whether the stacker crane is accommodated in the maintenance room can be determined more reliably.

In a stocker system according to an aspect of a preferred embodiment of the present invention, two stacker cranes may be in the stocker, and the operation controller may prohibit, throughout the stocker in which the presence of one of the stacker cranes is recognized by the determiner, the other stacker crane from operating. This configuration can prevent collision between two stacker cranes in the stocker.

A stocker system according to an aspect of a preferred embodiment of the present invention may further include a second cable including a proximal end portion in the stocker and a distal end portion connected to the stacker crane, and a third detector in each of the stockers to detect the second cable. The determiner may determine whether the stacker crane is present inside the stocker, based on a detection result in the third detector. This configuration can determine whether the stacker crane is present in the stocker, with a simpler configuration, by using the second cable connected to the stacker crane.

According to preferred embodiments of the present invention, the safety of operators in maintenance operation can be ensured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings. The same or equivalent elements are denoted by the same reference signs and an overlapping description will be omitted.

Figure 1:
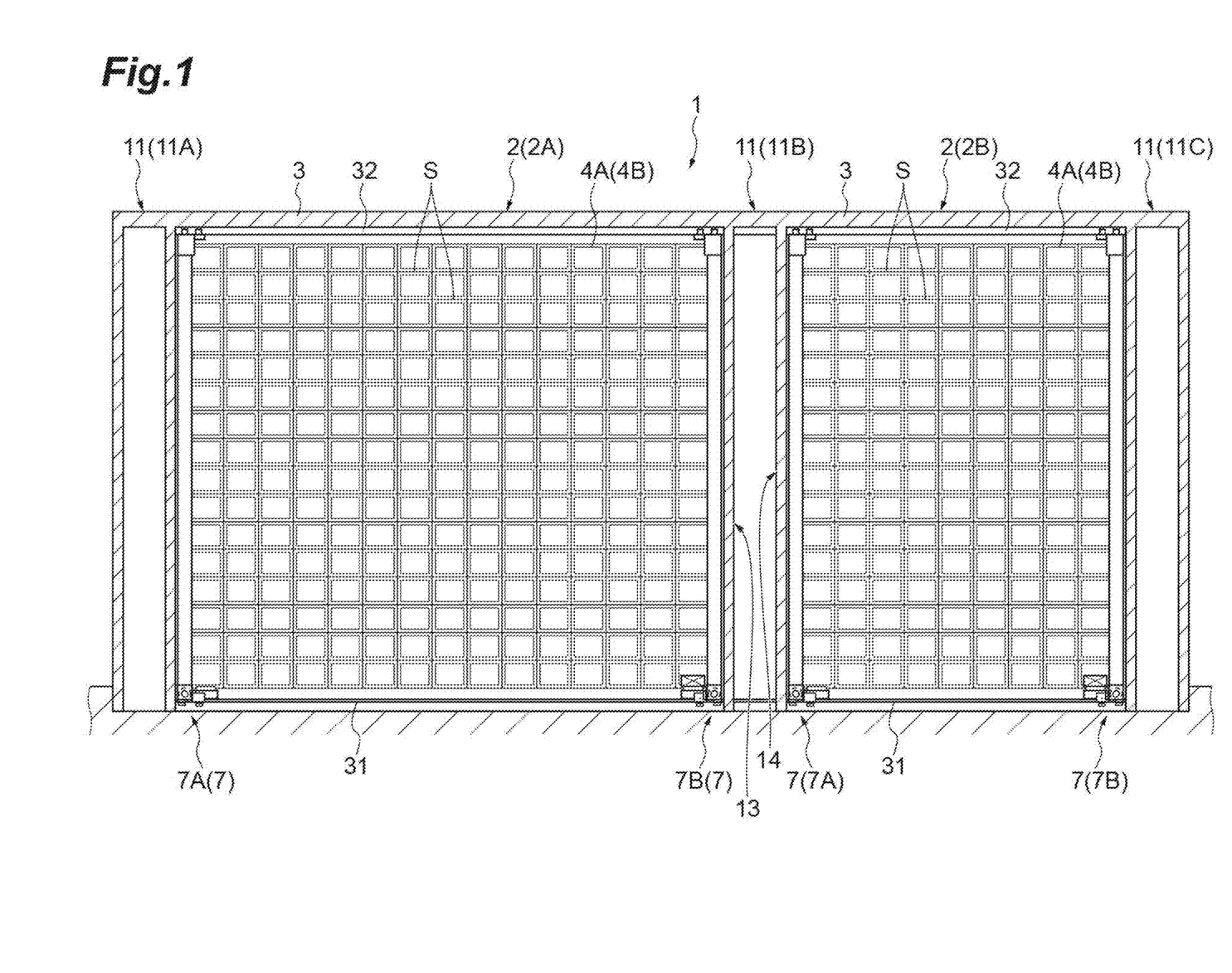
FIG. 1 is a front view of a stocker system according to a preferred embodiment of the present invention.

As illustrated in FIG. 1, a stocker system 1 according to a preferred embodiment includes a plurality of stockers 2. In each stocker 2, stacker cranes 7A and 7B travel inside a stocker body 3 and transport articles A between a plurality of shelves provided inside the stocker body 3 and an inbound/outbound port (not shown). The stocker 2 stores therein, for example, an article A transported by a transport device. The article A is, for example, a front-opening unified pod (FOUP) accommodating a wafer processed by a semiconductor manufacturing apparatus or a liquid crystal manufacturing apparatus and a container such as a reticle pod accommodating a reticle for use in a semiconductor manufacturing apparatus or a liquid crystal manufacturing apparatus.

In the stocker system 1, two or more (a plurality of) stockers 2 (stocker 2A and stocker 2B) are arranged in a traveling direction of the stacker cranes 7A and 7B traveling inside the stocker 2. The stocker system 1 is provided with a controller 10 configured or programmed to control traveling of two stacker cranes 7A and 7B and the like inside each stocker 2. Two stacker cranes 7A and 7B inside the stocker 2 place articles A on shelves S in racks 4A and 4B or retrieve articles A from shelves S under control by the controller 10. The stocker 2 includes the stocker body 3, the racks 4A and 4B, and the stacker cranes 7A and 7B.

Figure 2:
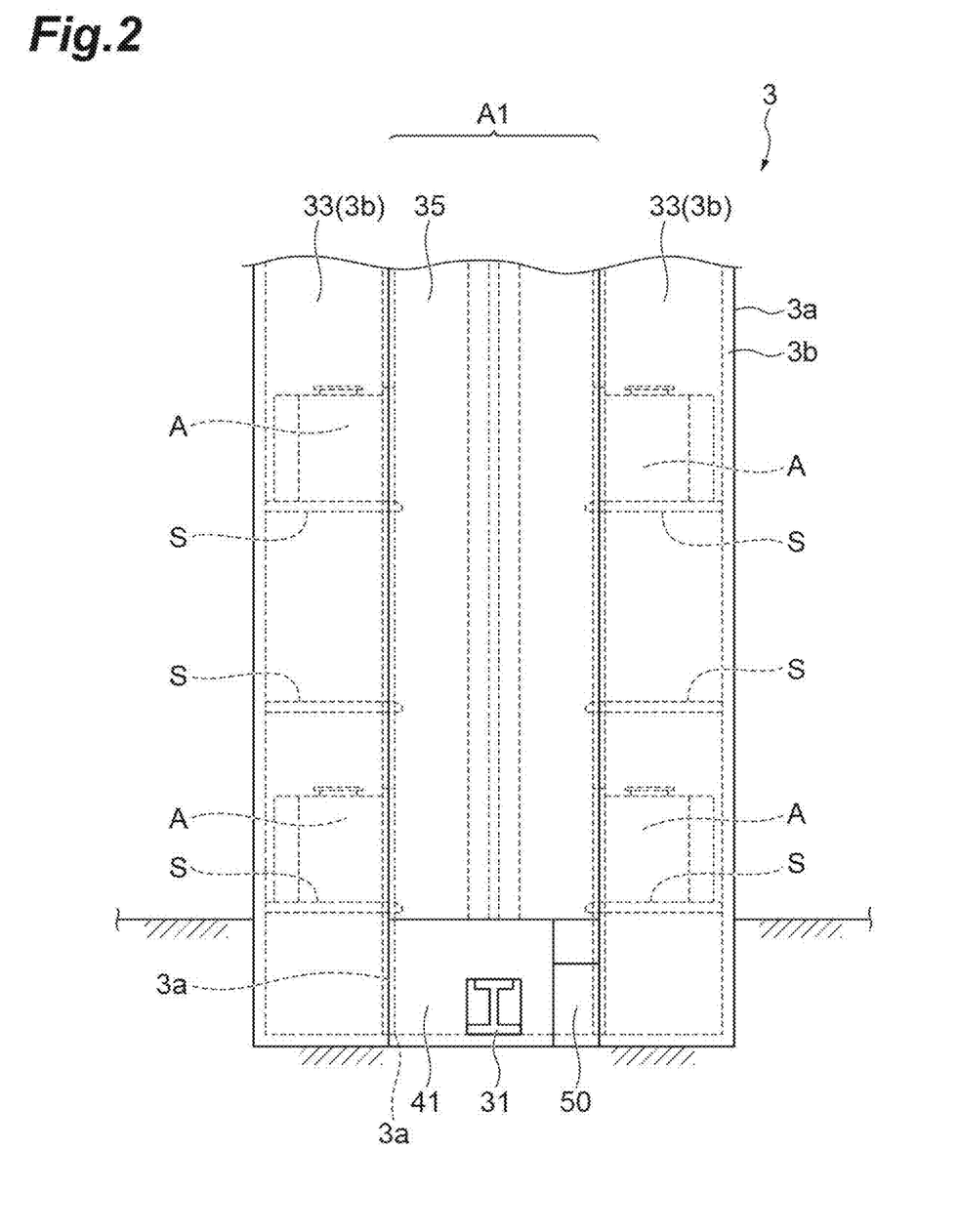
FIG. 2 is a side view of the stocker system included in FIG. 1.

As illustrated in FIG. 1 and FIG. 2, the stocker body 3 is formed in the shape of a case (for example, a hollow parallelepiped) surrounding a predetermined space extending in one direction. The stocker body 3 includes a frame 3a and panels 3b. In the stocker body 3, a traveling rail 31 on which the stacker cranes 7A and 7B travel and an auxiliary rail 32 disposed to face the traveling rail 31 in the vertical direction are provided. The stacker cranes 7A and 7B travel along the traveling rail 31 and the auxiliary rail 32. The stocker body 3 has a traveling region A1 in which the stacker cranes 7A and 7B travel.

The racks 4A and 4B are disposed in the stocker body 3. The rack 4A and the rack 4B are disposed along the traveling region A1. The rack 4A and the rack 4B are disposed to face each other in a width direction orthogonal to an extending direction of the traveling region A1 (traveling rail 31) and the vertical direction. Each of the racks 4A and 4B includes a plurality of shelves S to accommodate articles A.

Maintenance rooms 11 are disposed on both ends in the extending direction of the traveling region A1 of the stocker 2. The maintenance rooms 11 include a maintenance room 11A disposed on the left end of the stocker 2A, a maintenance room 11B disposed between the stocker 2A and the stocker 2B, and a maintenance room 11C disposed on the right end of the stocker 2B. The maintenance room 11A is configured to accommodate the stacker crane 7A in the stocker 2A. The maintenance room 11B is configured to accommodate (allow entry of) both of the stacker crane 7B in the stocker 2A and the stacker crane 7A in the stocker 2B. In the present preferred embodiment, the maintenance room 11B does not have a space for accommodating the stacker crane 7B and the stacker crane 7A at the same time and is unable to accommodate one of the stacker crane 7B and the stacker crane 7A when accommodating the other, for example. The maintenance room 11C is configured to accommodate the stacker crane 7B in the stocker 2B.

A first boundary 13 that is a boundary between the stocker 2A and the maintenance room 11B will be described. The first boundary 13 includes end portions 33 including the panels 3b attached to the frame 3a, a shutter 35, a first cover 41, and a second cover (partitioning plate) 50. When viewed from the extending direction of the traveling rail 31, the end portions 33 are disposed to sandwich the traveling region A1 and extend from the upper end to the lower end of the stocker body 3.

The shutter 35 is disposed at a position overlapping with the traveling region A1 when viewed from the extending direction of the traveling rail 31. In other words, the shutter 35 is sandwiched between the end portions 33 and 33. Furthermore, the shutter 35 is disposed at a corresponding portion above traveling units 71 of the stacker crane 7A and the stacker crane 7B in the top-bottom direction. The shutter 35 can open and close between an open state in which the stacker crane 7A and the stacker crane 7B can go back and forth between the stocker 2A and the maintenance room 11B and a closed state in which the stocker 2A and the maintenance room 11B are blocked from each other and the stacker crane 7A and the stacker crane 7B are unable to go back and forth between the stocker 2A and the maintenance room 11B. The open state and the closed state in the shutter 35 are detected by a first shutter detector 35A (see FIG. 8). The detection result by the first shutter detector 35A is acquired by the controller 10.

The first cover 41 is disposed at a position overlapping with the traveling region A1 when viewed from the extending direction of the traveling rail 31, in the same manner as the shutter 35. In other words, the first cover 41 is sandwiched between the end portions 33 and 33. Furthermore, the first cover 41 is disposed below the shutter 35 and at a portion corresponding to the traveling units 71 of the stacker crane 7A and the stacker crane 7B in the top-bottom direction. The first cover 41 is a plate-shaped structure provided removably from the frame 3a and its portion corresponding to the traveling rail 31 is notched. In other words, the first cover 41 is structured to allow the traveling rail 31 to pass through.

When removed from the frame 3a, the first cover 41 can make the open state in which the stacker crane 7A and the stacker crane 7B can go back and forth between the stocker 2A and the maintenance room 11B. When attached to the frame 3a, the first cover 41 can make the closed state in which the stocker 2A and the maintenance room 11B are blocked from each other and the stacker crane 7A and the stacker crane 7B are unable to go back and forth between the stocker 2A and the maintenance room 11B.

The second cover 50 is disposed at a position overlapping with the traveling region A1 when viewed from the extending direction of the traveling rail 31, in the same manner as the first cover 41. In other words, the second cover 50 is sandwiched between the end portions 33 and 33. Furthermore, the second cover 50 is disposed below the shutter 35 in the top-bottom direction and to the right of the first cover 41 and is disposed at a portion corresponding to the traveling units 71 of the stacker crane 7A and the stacker crane 7B (more specifically, a power cable 8).

When removed from the frame 3a, the second cover 50 can make the open state in which the stacker crane 7A and the stacker crane 7B can go back and forth between the stocker 2A and the maintenance room 11B. When attached to the frame 3a, the second cover 50 can make the closed state in which the stocker 2A and the maintenance room 11B are blocked from each other and the stacker crane 7A and the stacker crane 7B are unable to go back and forth between the stocker 2A and the maintenance room 11B. The detail of the second cover 50 will be described later.

A second boundary 14 that is a boundary between the stocker 2B and the maintenance room 11B will be described. The second boundary 14 includes end portions 33 including the panels 3b attached to the frame 3a, a shutter 35, a first cover 41, and a second cover (partitioning plate) 50, in the same manner as the first boundary 13. The configuration of the end portions 33, the shutter 35, the first cover 41, the second cover 50, and a second shutter detector 35B (see FIG. 8) is as described above and will not be further elaborated here.

Figure 3:
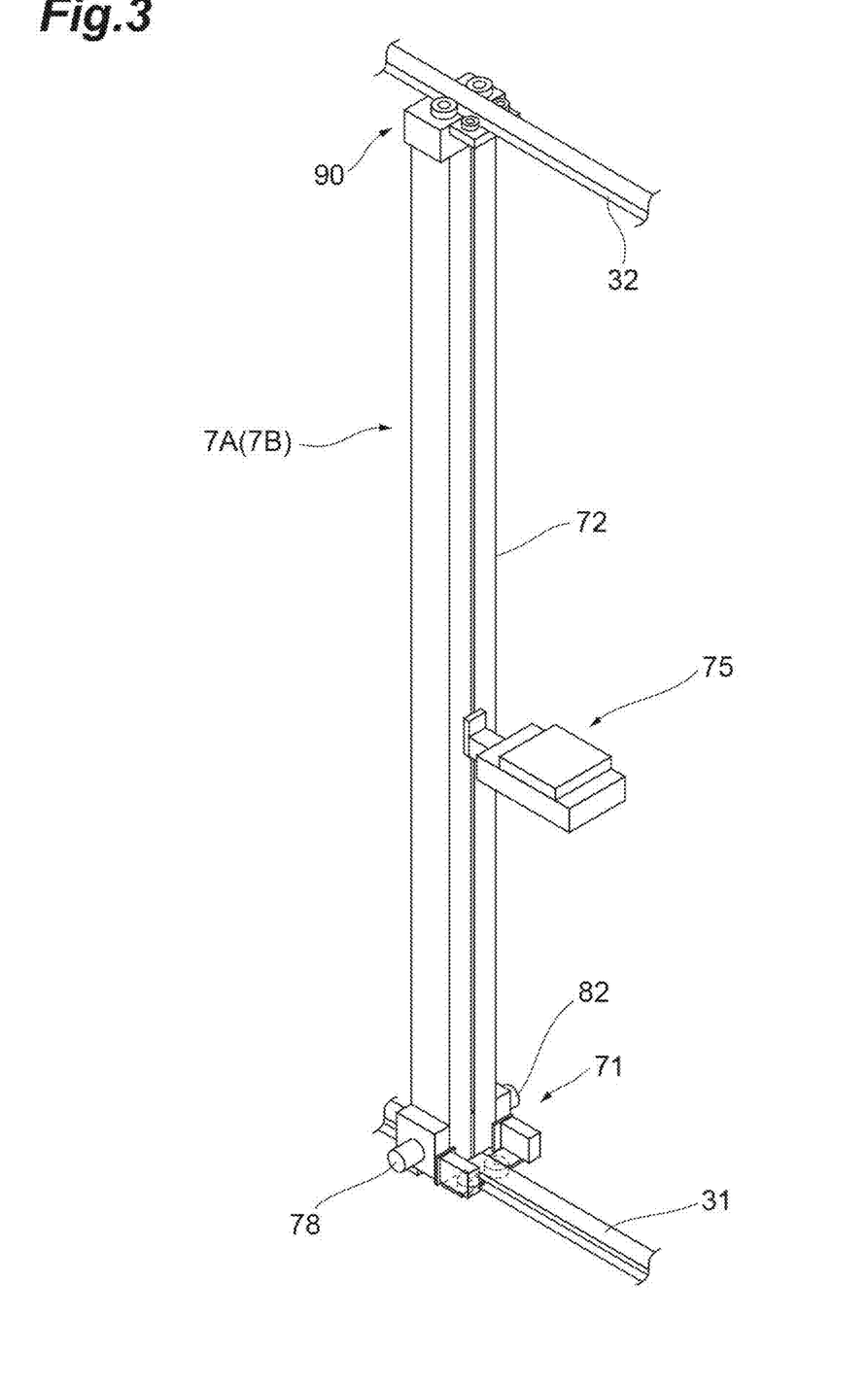
FIG. 3 is a perspective view of a stacker crane included in FIG. 1.

As illustrated in FIG. 1, each of the stacker crane 7A and the stacker crane 7B travels along the traveling rail 31, transports an article A between a shelf S and an inbound/outbound port, and transfers (loads and unloads) the article A to the shelf S. In FIG. 1 (as viewed from the front), the stacker crane 7B is disposed to the right side of the stacker crane 7A in the extending direction of the traveling rail 31 and the auxiliary rail 32. As illustrated in FIG. 3, the stacker crane 7A includes the traveling unit 71, a mast 72, a transfer unit 75, and an auxiliary traveling unit 90. The traveling unit 71 includes a traveling motor 78, a lifting motor 82, and a housing 85.

The traveling unit 71 travels along the traveling rail 31. The traveling unit 71 includes a driving wheel that rolls along an upper surface of the traveling rail 31. The traveling motor 78 is a drive source for a traveling driving wheel 76. The lifting motor 82 is a drive source for an elevation stage 73. The housing 85 (see FIG. 4 and FIG. 6) accommodates the traveling motor 78 and the lifting motor 82. FIG. 3 illustrates a state in which the housing is removed. The mast 72 is provided upright in the vertical direction on the top of the traveling unit 71 described in detail later. The transfer unit 75 transfers an article A to/from a shelf S and transfers an article A to/from the inbound/outbound port. The auxiliary traveling unit 90 travels along the auxiliary rail 32. The auxiliary traveling unit 90 includes a pair of driving wheels that roll with the auxiliary rail 32 sandwiched therebetween.

Figure 4:
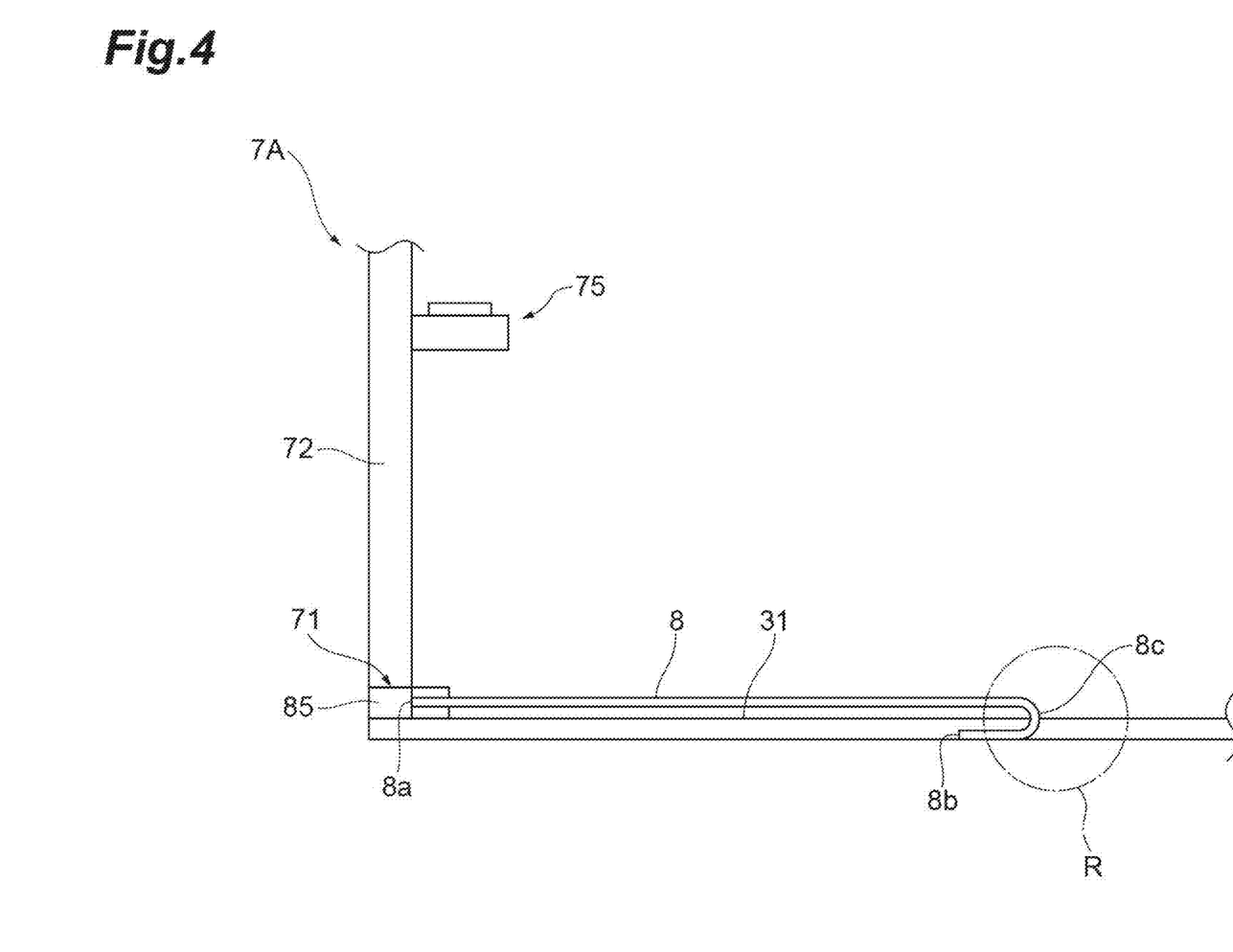
FIG. 4 is a partially enlarged front view of the stacker crane included in FIG. 1.
Figure 5:
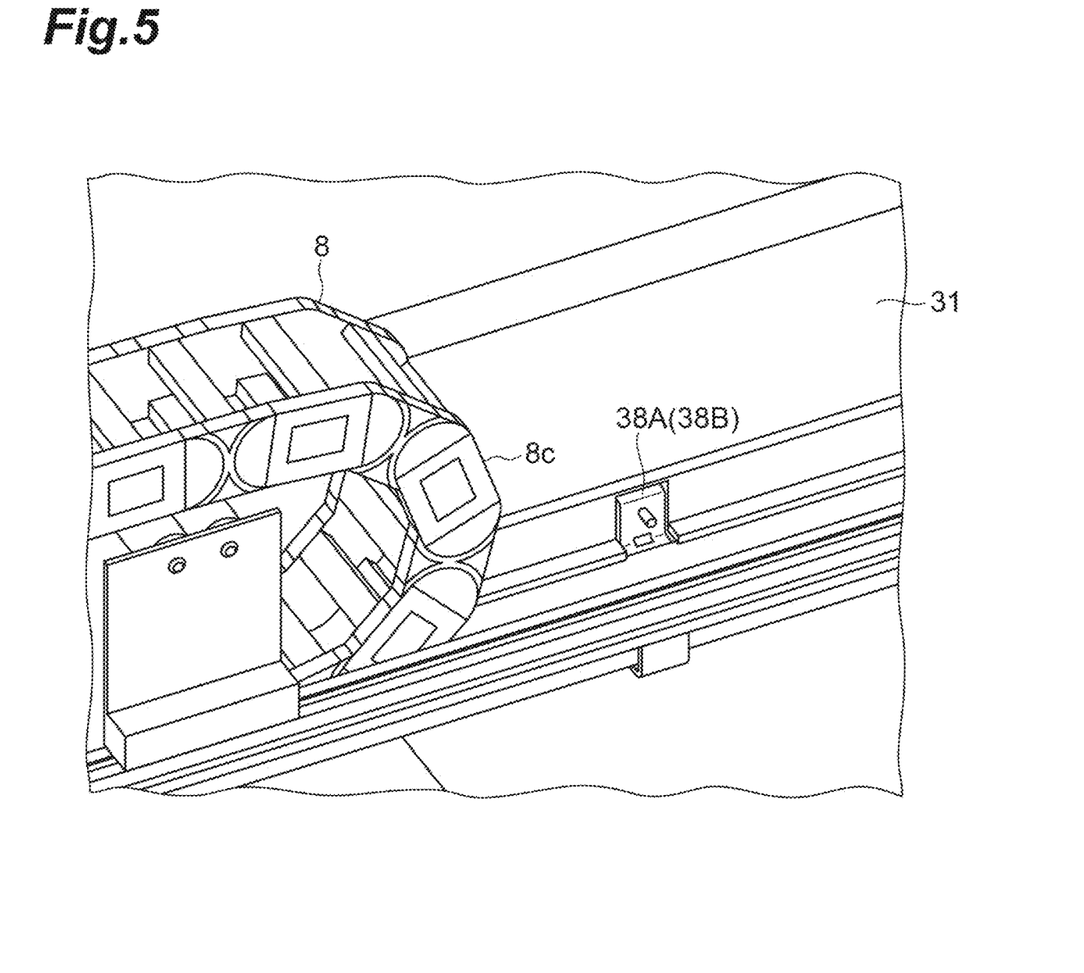
FIG. 5 is a perspective view of a U-shaped portion of a power cable connected to the stacker crane included in FIG. 1 and the vicinity thereof.
Figure 6:
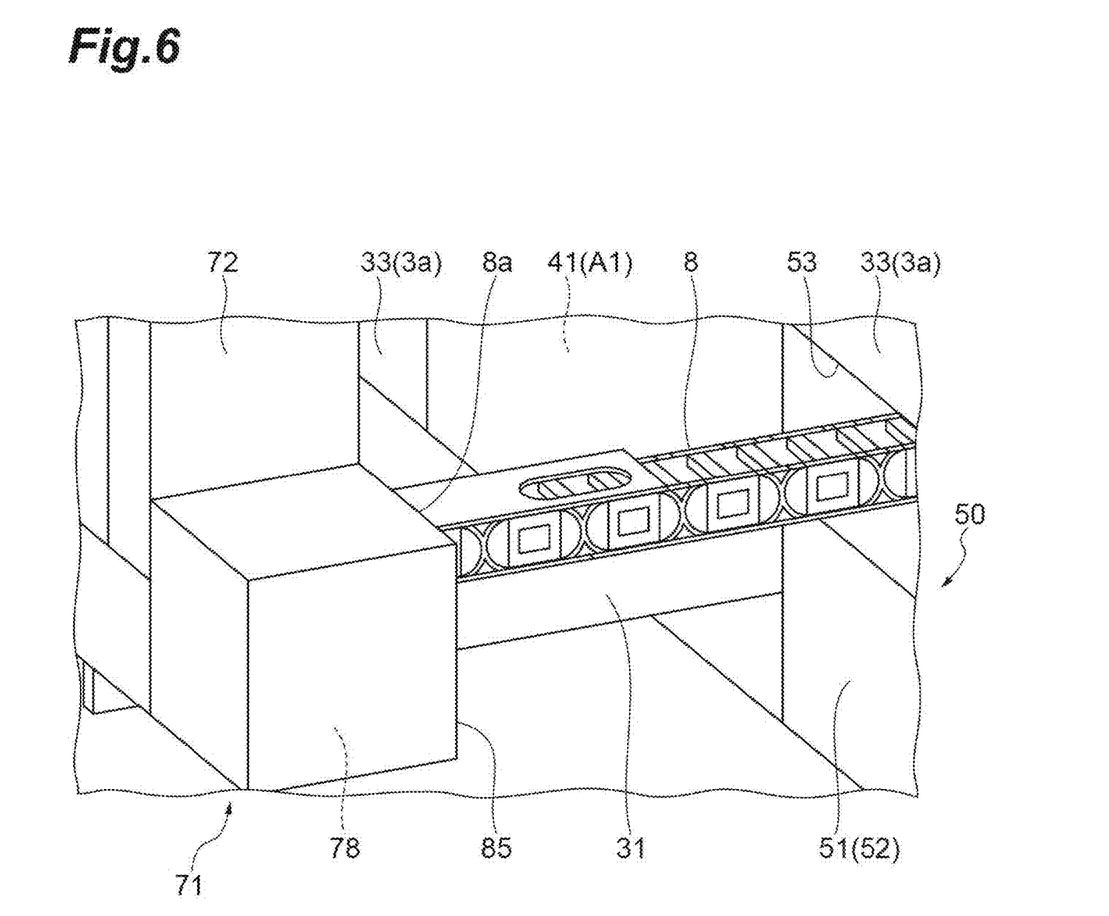
FIG. 6 is a perspective view of a distal end of the power cable connected to the stacker crane included in FIG. 1 and the vicinity thereof.

As illustrated in FIG. 4 to FIG. 6, a distal end portion 8a of the flexible power cable 8 is connected to the traveling unit 71 of the stacker crane 7A. A proximal end portion 8b of the power cable 8 is disposed substantially at the center of the stocker body 3. The power cable 8 connects a power source (not illustrated) installed in the stocker 2A (or the stocker 2B) to the stacker crane 7A. In other words, the stacker crane 7A receives power from the power source (not illustrated) through the power cable 8. The power cable 8 includes a U-shaped portion 8c folded in the shape of U between the distal end portion 8a and the proximal end portion 8b. In FIG. 5 and FIG. 6 in the present preferred embodiment, the power cable 8 is accommodated in a cable support guide including one end fixed to the stocker body 3 (proximal end portion 8b) and the other end fixed to the stacker crane 7A (distal end portion 8a). However, the cable support guide is not necessarily provided.

As illustrated in FIG. 4 and FIG. 5, the U-shaped portion 8c of the power cable 8 connected to the stacker crane 7A in the stocker 2B moves leftward with the leftward movement of the stacker crane 7A. A second cable detector (third detector) 38B detects the power cable 8. The second cable detector 38B disposed in the stocker 2B is disposed at a position where it does not detect the power cable 8 when the stacker crane 7A is moved leftward and accommodated in the maintenance room 11B. An example of the second cable detector 38B is a switch that turns on and off, depending on whether the power cable 8 is in contact.

Here, the power cable 8 of the stacker crane 7A is provided at one end of the traveling unit 71 in the right-left direction as viewed from the extending direction of the traveling rail 31, and the power cable 8 of the stacker crane 7B is provided at the other end of the traveling unit 71 in the right-left direction as viewed from the traveling rail 31. Such a configuration prevents the power cable 8 of the stacker crane 7A and the power cable 8 of the stacker crane 7B from interfering with each other.

The stacker crane 7B has a configuration symmetric to the configuration of the stacker crane 7A, but there is no difference in function, and the stacker crane 7B will not be further described below. A first cable detector (third detector) 38A disposed in the stocker 2A to detect the power cable 8 connected to the stacker crane 7B is disposed at a position where it does not detect the power cable 8 when the stacker crane 7B is moved rightward and accommodated in the maintenance room 11B.

Figure 7A:
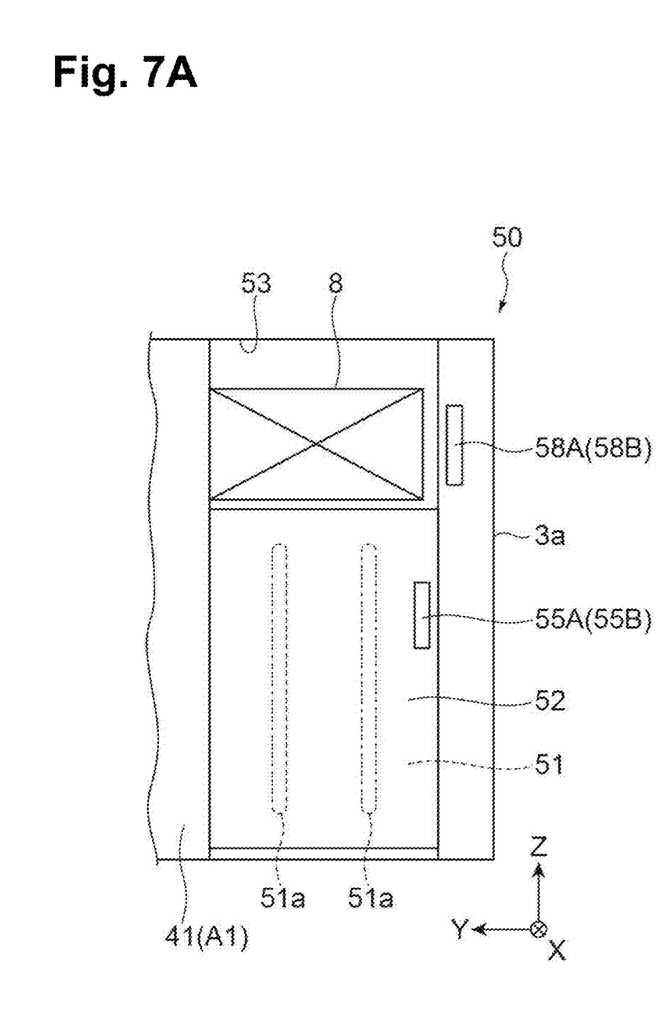
FIG. 7A is a side view of a second cover in an open state and FIG. 7B is a side view of the second cover in a closed state.
Figure 7B:
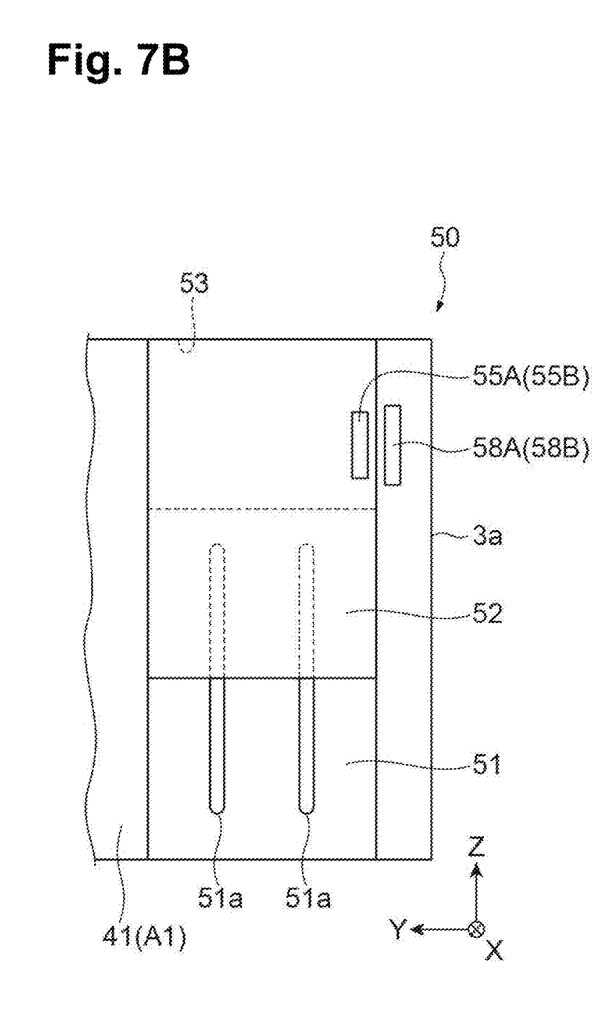

As illustrated in FIGS. 7A and 7B, the second cover 50 of the first boundary 13 includes a body 51, a slider (door) 52, and a detection target 55A. The body 51 is attached to the frame 3a removably from the frame 3a in an appropriate manner. The slider 52 is provided slidably in the top-bottom direction on the body 51. For example, the slider 52 includes engagement portions (not illustrated) engaged in slide grooves 51a provided at the body 51.

As illustrated in FIG. 2, FIGS. 7A and 7B, the first cover 41 and the second cover 50 are attached to the frame 3a, the slider 52 of the second cover 50 is slid downward to form an opening portion 53 (see FIG. 7A), and the slider 52 of the second cover 50 is slid upward to close (block) the opening portion 53 (see FIG. 7B). The opening portion 53 is provided to be matched with the position of the power cable 8 when viewed from the extending direction of the traveling rail 31. In other words, the opening portion 53 is located at a position to allow the power cable 8 across the first boundary 13 (or the second boundary 14) to pass through.

The frame 3a including the second cover 50 attached thereto is provided with a first cover detector (first detector) 58A to detect the detection target 55A. The first cover detector 58A detects the detection target 55A proximate to the first cover detector 58A or the detection target 55A in contact with the first cover detector 58A. Because of such characteristics of the detection target 55A and the first cover detector 58A, the first cover detector 58A does not detect the detection target 55A when the slider 52 is in a lower position (in the open state). In contrast, the first cover detector 58A detects the detection target 55A when the slider 52 is in a higher position (in the closed state). The detection result in the first cover detector 58A is acquired by the controller 10.

The second cover 50 of the second boundary 14 also includes a body 51, a slider (door) 52, and a detection target 55B, in the same manner as the second cover 50 of the first boundary 13. Furthermore, the frame 3a having the second cover 50 attached thereto is provided with a second cover detector (second detector) 58B to detect the detection target 55B. The function of each portion is as described above and will not be further elaborated here.

Figure 8:
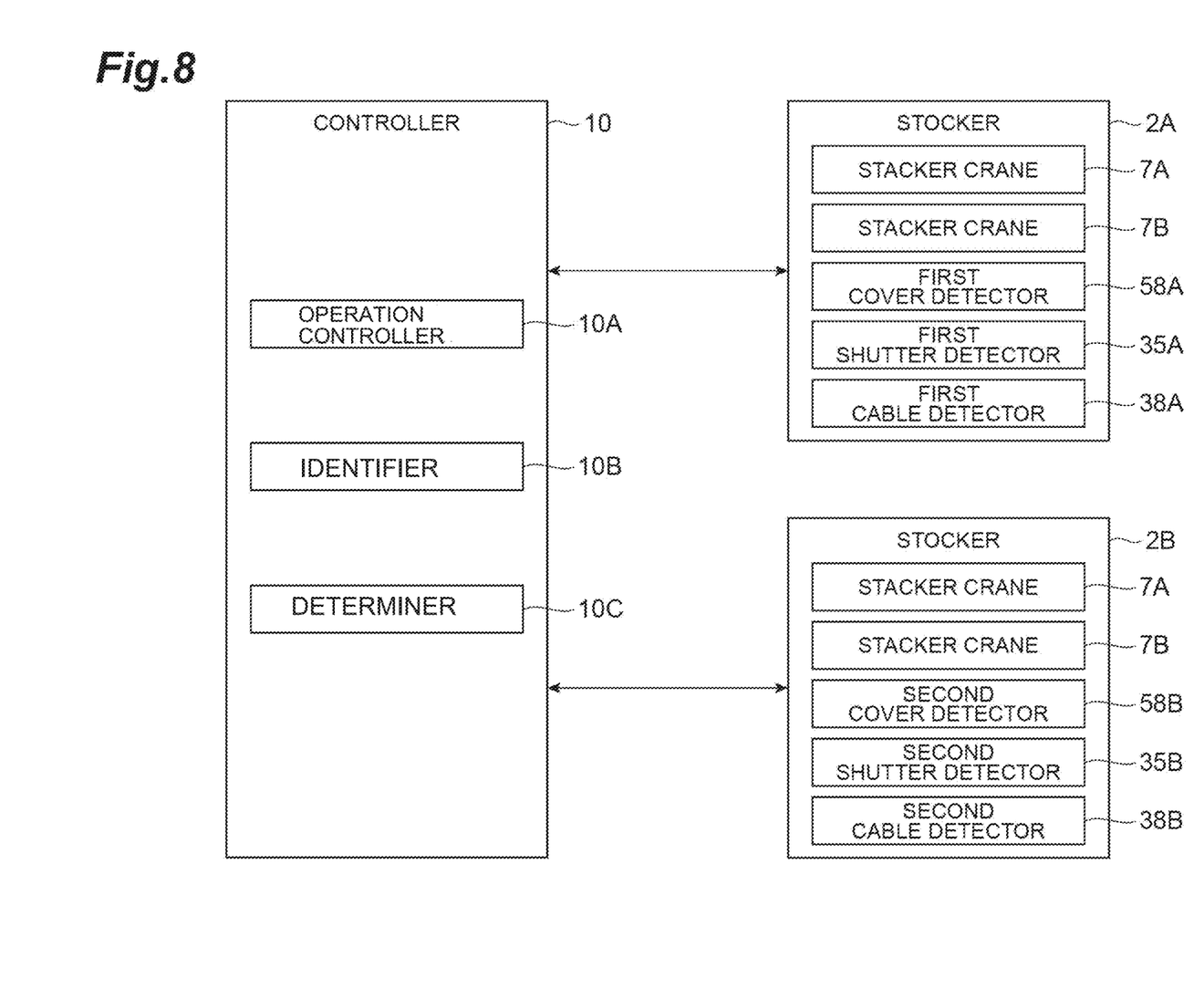
FIG. 8 is a functional block diagram of the stocker system in FIG. 1.

The controller 10 is an electronic controller including a central processing unit (CPU), a read only memory (ROM), and a random access memory (RAM). The controller 10 is configured or programmed to control various operations of the stacker cranes 7A and 7B in the stockers 2A and 2B. Furthermore, the controller 10 can be configured, for example, as software such that a program stored in the ROM is loaded into the RAM and executed by the CPU. The controller 10 may be configured as hardware with electronic circuitry, for example. In the controller 10, hardware such as the CPU, the RAM, and the ROM and software such as a program cooperate to define and function as an operation controller 10A, an identifier 10B, and a determiner 10C described below.

The operation controller 10A restricts the operation of the stacker crane 7A identified by the identifier 10B. More specifically, the operation controller 10A prohibits the operation of the stacker crane 7A or the stacker crane 7B identified by the identifier 10B.

When the determiner 10C recognizes the presence of the stacker crane 7B (one of the stacker cranes) in the stocker 2A, the operation controller 10A prohibits the stacker crane 7A (the other stacker crane) from operating throughout the stocker 2A. Furthermore, when the determiner 10C recognizes the presence of the stacker crane 7A (one of the stacker cranes) in the stocker 2B, the operation controller 10A prohibits the stacker crane 7B (the other stacker crane) from operating throughout the stocker 2B. For example, when the determiner 10C recognizes that the stacker crane 7A in the stocker 2B is present in the stocker 2B, the operation controller 10A prohibits the stacker crane 7B in the stocker 2B from operating throughout the stocker 2B.

The identifier 10B identifies which of the stacker cranes (stacker crane 7A or stacker crane 7B) in the stocker 2A and the stocker 2B adjacent to each other is the stacker crane accommodated in the maintenance room 11B. The identifier 10B identifies which of the stacker cranes (stacker crane 7A or stacker crane 7B) in the stocker 2A and the stocker 2B adjacent to each other is the stacker crane, based on the detection results of the first cover detector 58A and the second cover detector 58B.

More specifically, the identifier 10B identifies that the stacker crane 7B of the stocker 2A is accommodated in the maintenance room 11B when the detection target 55A is not detected by the first cover detector 58A (that is, in a state in which the opening portion 53 is open). Furthermore, the identifier 10B identifies that the stacker crane 7A of the stocker 2B is accommodated in the maintenance room 11B when the detection target 55B is not detected by the second cover detector 58B (that is, in a state in which the opening portion 53 is open).

The determiner 10C determines whether the stacker crane 7B is present in the stocker 2A and determines whether the stacker crane 7A is present in the stocker 2B. More specifically, the determiner 10C determines whether the stacker crane 7B is present in the stocker 2A based on the detection result of the first cable detector 38A and determines whether the stacker crane 7A is present in the stocker 2B based on the detection result of the second cable detector 38B.

A method of use of the first cover 41 and the second cover 50 will now be described. The stocker 2A and the stocker 2B bring the stacker crane 7A and the stacker crane 7B into operation, with the first cover 41 and the second cover 50 attached to the frame 3a. That is, the stacker crane 7A and the stacker crane 7B do not operate unless the first cover 41 and the second cover 50 are attached to the frame 3a. A detector such as a sensor may be provided to detect that the first cover 41 and the second cover 50 are attached to the frame 3a.

To accommodate the stacker crane 7A of the stocker 2B in the maintenance room 11B, the operator opens the shutter 35 and removes the first cover 41 and the second cover 50 from the frame 3a. Subsequently, the operator moves the stacker crane 7A to the maintenance room 11B. Subsequently, the operator attaches the first cover 41 to the frame 3a. Subsequently, the operator sets the slider 52 in a lowered state (that is, a state in which the opening portion 53 is provided, and the power cable 8 connected to the stacker crane 7A is inserted in the opening portion 53) and attaches the second cover 50 to the frame 3a. This completes accommodation of the stacker crane 7A in the maintenance room 11B and enables operation of the stacker crane 7B in the stocker 2B. The stacker crane 7A accommodated in the maintenance room 11B is prohibited from being operated by the controller 10 as described above.

To return the stacker crane 7A accommodated in the maintenance room 11B to the stocker 2B, the procedure above is followed in reverse order. To accommodate the stacker crane 7B of the stocker 2A in the maintenance room 11B, a procedure similar to the procedure for accommodating the stacker crane 7A of the stocker 2B in the maintenance room 11B is followed, and a detailed description is omitted.

The operation effect of the stocker system 1 in the present preferred embodiment will now be described. Since the stocker system 1 in the foregoing preferred embodiment can identify which of the stacker cranes (stacker crane 7A or stacker crane 7B) in the stocker 2A and the stocker 2B adjacent to each other is the stacker crane accommodated in the maintenance room 11B, the operation of the stacker crane whose operation should be restricted in the maintenance room 11B can be restricted reliably. This configuration can prevent the operator from being in danger due to the operation of the stacker crane accommodated in the maintenance room 11B. As a result, the safety of the operator in maintenance operation can be ensured.

In the stocker system 1 in the foregoing preferred embodiment, since the operation controller 10A prohibits the stacker crane (the stacker crane 7A or the stacker crane 7B) identified by the identifier 10B from operating, the safety of the operator in maintenance operation can be ensured more reliably.

In the stocker system 1 in the foregoing preferred embodiment, the stacker crane accommodated in the maintenance room 11B is identified using the power cables 8 connected to the stacker crane 7A and the stacker crane 7B. More specifically, the stacker crane accommodated in the maintenance room 11B is identified based on whether there is an opening in the second cover 50 attached to the second boundary 14 and the first boundary 13. This configuration can identify which of the stacker cranes (stacker crane 7A or stacker crane 7B) in the stocker 2A and the stocker 2B adjacent to each other is the stacker crane accommodated in the maintenance room 11B, with a simpler configuration.

The stocker system 1 in the foregoing preferred embodiment includes the determiner 10C that determines whether the stacker crane 7B is present in the stocker 2A and determines whether the stacker crane 7A is present in the stocker 2B. Since this configuration can determine the possibility that the stacker crane 7B is present inside the stocker 2A and determine the possibility that the stacker crane 7A is present inside the stocker 2B, it can be determined more reliably whether the stacker crane 7B is accommodated in the maintenance room 11B and whether the stacker crane 7A is accommodated in the maintenance room 11B.

In the stocker system 1 in the foregoing preferred embodiment, the operation controller 10A prohibits, throughout the stocker 2A in which the presence of one stacker crane 7B is recognized by the determiner 10C, the other stacker crane 7A from operating and prohibits, throughout the stocker 2B in which the presence of one stacker crane 7A is recognized, the other stacker crane 7B from operating. This configuration can prevent collision between the stacker crane 7A and the stacker crane 7B in the stocker 2B and the stocker 2A.

In the stocker system 1 in the foregoing preferred embodiment, the determiner 10C determines whether the stacker crane 7A is present in the stocker 2B, based on the detection result in the second cable detector 38B detecting the power cable 8, and determines whether the stacker crane 7B is present in the stocker 2A, based on the detection result in the first cable detector 38A detecting the power cable 8. In this configuration, it can be determined whether the stacker crane 7B is present in the stocker 2A and whether the stacker crane 7A is present in the stocker 2B, with a simpler configuration.

The stocker system 1 in the foregoing preferred embodiment has been described with an example where the stacker crane 7A or the stacker crane 7B present in the maintenance room 11B is determined based on the presence/absence of the power cable 8. However, aspects of various preferred embodiments of the present invention is not limited thereto. For example, the presence of the stacker crane 7A or the stacker crane 7B in the maintenance room 11B is detected by a plurality of sensors that directly detect only one of the stacker crane 7A or the stacker crane 7B, thus identifying which of the stacker cranes in the adjacent stockers is the stacker crane accommodated in the maintenance room 11B.

The foregoing preferred embodiments and modifications have been described with an example where the opening portion 53 to allow the power cable 8 to pass through and the door that switches the open state in which the opening portion 53 is open and the closed state in which the opening portion 53 is closed and is slidable in the top-bottom direction are configured as the slider 52. However, aspects of preferred embodiments of the present invention is not limited thereto. For example, a member that covers the opening portion 53 may be removably provided on the body 51, or a member that covers the opening portion 53 may be attached to the body 51 using a hinge, for example.

The foregoing preferred embodiments and modifications have been described with an example where a power cable is connected to the stacker crane 7A and the stacker crane 7B. However, instead of or in addition to this configuration, a communication cable may be connected to the stacker crane 7A and the stacker crane 7B.

The foregoing preferred embodiments and modifications have been described with an example where the maintenance room 11B is unable to accommodate the stacker crane 7B and the stacker crane 7A at the same time. However, the maintenance room 11B may be able to accommodate both of the stacker crane 7B and the stacker crane 7A at the same time.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stocker system comprising:
    a plurality of stockers including a first stocker and a second stocker that are adjacent stockers,
    the first stocker including:
        a first shelf to accommodate an article;
        a first stacker crane to transfer the article;
        a first body accommodating the first shelf and the first stacker crane; and
        a first cable including a proximal end portion in the first stocker and a distal end portion connected to the first stacker crane; and
    the second stocker including:
        a second shelf to accommodate the article;
        a second stacker crane to transfer the article;
        a second body accommodating the second shelf and the second stacker crane; and
        a second cable including a proximal end portion in the second stocker and a distal end portion connected to the second stacker crane;
    an operation controller configured or programmed to control operation of the first stacker crane and the second stacker crane;
    a maintenance room between the first stocker and the second stocker to allow entry of both of the first stacker crane and the second stacker crane, and capable of accommodating at least one of the first stacker crane and the second stacker crane; and
    a first partitioning plate at a first boundary between the first stocker and the maintenance room, the first partitioning plate including a first opening portion to allow the first cable to pass through and a door to switch between an open state in which the first opening portion is open and a closed state in which the first opening portion is closed;
    a second partitioning plate at a second boundary between the second stocker and the maintenance room, the second partitioning plate including a second opening portion to allow the second cable to pass through and a door to switch between an open state in which the second opening portion is open and a closed state in which the second opening portion is closed;
    a first detector to detect whether the first opening portion is open or closed;
    a second detector to detect whether the second opening portion is open or closed;
    an identifier configured or programmed to identify the at least one of the first stacker crane and the second stacker crane accommodated in the maintenance room based on detection results of the first detector and the second detector; wherein
    the operation controller is configured or programmed to restrict operation of the at least one of the first stacker crane and the second stacker crane identified by the identifier.

2. The stocker system according to claim 1, wherein the operation controller is configured or programmed to prohibit the at least one of the first stacker crane and the second stacker crane identified by the identifier from operating.

3. The stocker system according to claim 2, further comprising a determiner configured or programmed to determine whether the first stacker crane is present inside the first stocker and whether the second stacker crane is present inside the second stocker.

4. The stocker system according to claim 3, wherein
    the first stocker includes an additional stacker crane, and
    when the determiner determines that the first stacker crane is present inside the first stocker, the operation controller is configured or programmed to prohibit the additional stocker from operating throughout the first stocker.

5. The stocker system according to claim 4, further comprising:
a third detector included in the first stocker to detect the first cable; and
a fourth detector included in the second stocker to detect the second cable; wherein
the determiner is configured or programmed to determine whether the first stacker crane is present inside the first stocker, based on a detection result in the third detector; and
the determiner is configured or programmed to determine whether the second stacker crane is present inside the second stocker based on a detection result in the fourth detector.

6. The stocker system according to claim 3, further comprising:
a third detector included in the first stocker to detect the first cable; and
a fourth detector included in the second stocker to detect the second cable; wherein
the determiner is configured or programmed to determine whether the first stacker crane is present inside the first stocker based on a detection result in the third detector; and
the determiner is configured or programmed to determine whether the second stacker crane is present inside the second stocker based on a detection result in the fourth detector.

7. The stocker system according to claim 1, further comprising a determiner configured or programmed to determine whether the first stacker crane is present inside the first stocker and whether the second stacker crane is present inside the second stocker.

8. The stocker system according to claim 7, wherein
the first stocker includes an additional stacker crane, and
when the determiner determines that the first stacker crane is present inside the first stocker, the operation controller is configured or programmed to prohibit the additional stocker from operating throughout the first stocker.

9. The stocker system according to claim 8, further comprising:
a third detector included in the first stocker to detect the first cable; and
a fourth detector included in the second stocker to detect the second cable; wherein
the determiner is configured or programmed to determine whether the first stacker crane is present inside the first stocker based on a detection result in the third detector; and
the determiner is configured or programmed to determine whether the second stacker crane is present inside the second stocker based on a detection result in the fourth detector.

10. The stocker system according to claim 7, further comprising:
a third detector included in the first stocker to detect the first cable; and
a fourth detector included in the second stocker to detect the second cable; wherein
the determiner is configured or programmed to determine whether the first stacker crane is present inside the first stocker, based on a detection result in the third detector; and
the determiner is configured or programmed to determine whether the second stacker crane is present inside the second stocker based on a detection result in the fourth detector.

11. A stocker system comprising:
a plurality of stockers including a first stocker and a second stocker that are adjacent stockers,
the first stocker including:
a first shelf to accommodate an article;
a first stacker crane to transfer the article;
a first body accommodating the first shelf and the first stacker crane; and
a first cable including a proximal end portion in the first stocker and a distal end portion connected to the first stacker crane; and
the second stocker including:
a second shelf to accommodate the article;
a second stacker crane to transfer the article;
a second body accommodating the second shelf and the second stacker crane; and
a second cable including a proximal end portion in the second stocker and a distal end portion connected to the second stacker crane;
an operation controller configured or programmed to control operation of the first stacker crane and the second stacker crane;
a maintenance room between the first stocker and the second stocker to allow entry of both of the first stacker crane and the second stacker crane, and capable of accommodating at least one of the first stacker crane and the second stacker crane;
an identifier configured or programmed to identify the at least one of the first stacker crane and the second stacker crane accommodated in the maintenance room;
a determiner configured or programmed to determine whether the first stacker crane is present inside the first stocker and whether the second stacker crane is present inside the second stocker;
a first detector included in the first stocker to detect the first cable; and
a second detector included in the second stocker to detect the second cable; wherein
the determiner is configured or programmed to determine whether the first stacker crane is present inside the first stocker based on a detection result in the first detector; and
the determiner is configured or programmed to determine whether the second stacker crane is present inside the second stocker based on a detection result in the second detector;
the operation controller is configured or programmed to restrict operation of the at least one of the first stacker crane and the second stacker crane identified by the identifier;
the first stocker includes an additional stacker crane; and
when the determiner determines that the first stacker crane is present inside the first stocker, the operation controller is configured or programmed to prohibit the additional stocker from operating throughout the first stocker.

* * * * *